US012700772B2

(12) United States Patent (10) Patent No.: US 12,700,772 B2

Alecu (45) Date of Patent: Aug. 4, 2026

(54) ELECTRIC MACHINE COOLED WITH BYPASS AIR OF A TURBOFAN ENGINE

(71) Applicant: PRATT & WHITNEY CANADA CORP., Longueuil (CA)

(72) Inventor: Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 363 days.

(21) Appl. No.: 18/227,347

(22) Filed: Jul. 28, 2023

(65) Prior Publication Data

US 2025/0038619 A1    Jan. 30, 2025

(51) Int. Cl.
    H02K 7/14 (2006.01)
    F02C 7/32 (2006.01)
    H02K 9/06 (2006.01)

(52) U.S. Cl.
    CPC ................ H02K 9/06 (2013.01); F02C 7/32 (2013.01); H02K 7/14 (2013.01); F05D 2220/50 (2013.01)

(58) Field of Classification Search
    CPC .......... H02K 1/32; H02K 1/135; H02K 5/207; H02K 7/14; H02K 7/1823; H02K 7/20; H02K 9/06; F02C 7/32; F05D 2220/50
    See application file for complete search history.

(56) References Cited

U.S. PATENT DOCUMENTS

| | | | |
|---|---|---|---|
| 4,253,031 A | 2/1981 | Frister | |
| 4,562,367 A | 12/1985 | Kumatani | |
| 7,040,082 B2 | 5/2006 | Bouiller et al. | |
| 7,462,964 B2 | 12/2008 | Nagayama et al. | |
| 10,218,245 B2 | 2/2019 | Oxman et al. | |
| 2017/0363024 A1 | 12/2017 | Sivaraman | |
| 2018/0051716 A1* | 2/2018 | Cheung .................... | H02K 7/14 |
| 2019/0006913 A1* | 1/2019 | Stieger ................... | H02K 9/197 |
| 2019/0292993 A1* | 9/2019 | Pal .......................... | H02P 29/40 |
| 2022/0045573 A1* | 2/2022 | Seki .......................... | F02C 7/18 |
| 2022/0235671 A1* | 7/2022 | Rambo ................... | F01D 9/065 |

OTHER PUBLICATIONS

European Patent Office, Communication re extended European search report for European patent application No. 24191297.1, Dec. 18, 2024.

* cited by examiner

*Primary Examiner* — Eric Johnson

(74) *Attorney, Agent, or Firm* — Norton Rose Fulbright Canada LLP

(57)    ABSTRACT

Systems and methods for cooling electric machines are provided. A method for cooling an electric machine includes receiving a flow of air, expanding and cooling the air from the flow of air using a turbine, conveying the flow of air from the turbine through the electric machine to extract heat from the electric machine using the flow of air, and drawing the flow of air through the electric machine using an air mover.

7 Claims, 4 Drawing Sheets

100

102  Receive a flow of air.

104  Expand and cool the air from the flow of air.

106  Convey the flow of air through the electric machine to extract heat from the electric machine using the flow of air.

108  Draw the flow of air through the electric machine.

ELECTRIC MACHINE COOLED WITH BYPASS AIR OF A TURBOFAN ENGINE

TECHNICAL FIELD

The disclosure relates generally to electric machines, and more particularly to cooling electric machines.

BACKGROUND

Electric machines such as electric motors and electric generators generate heat during operation. In some installations, it is desirable to actively cool electric machines using air or oil. Larger electric machines are typically cooled using oil. Existing fluid cooling systems for electric machines can be relatively bulky and complicated. Improvement is desirable.

SUMMARY

In one aspect, the disclosure describes an electric machine system comprising:

a turbine interacting with a flow of air, the turbine having a turbine inlet receiving the flow of air and a turbine outlet discharging the flow of air;

an electric machine having a passage conveying the flow of air through the electric machine for cooling the electric machine, the passage having:

a passage inlet receiving the flow of air discharged from the turbine outlet; and a passage outlet discharging the flow of air; and a compressor drawing the flow of air through the passage of the electric machine, the compressor having:

a compressor inlet receiving the flow of air discharged from the passage outlet; and a compressor outlet discharging the flow of air.

The electric machine may include a machine stator and a machine rotor. The turbine may include a turbine rotor drivingly connected to the machine rotor for common rotation with the machine rotor.

A compressor rotor of the compressor may be drivingly connected to the machine rotor for common rotation with the machine rotor.

The machine rotor, the turbine rotor and the compressor rotor may be mounted on a same shaft.

The electric machine may include a machine stator and a machine rotor. The compressor may include a compressor rotor drivingly connected to the machine rotor for common rotation with the machine rotor.

The electric machine may include a machine stator and a machine rotor. A turbine rotor of the turbine, a compressor rotor of the compressor and the machine rotor may be coaxial. The electric machine may be disposed axially between the turbine and the compressor.

The compressor may be a centrifugal compressor.

The turbine may be a radial turbine.

The machine stator, the turbine rotor and the compressor rotor may be mounted for common rotation on a same shaft.

The passage inlet may be disposed at a first axial end of the electric machine. The passage outlet may be disposed at a second axial end of the electric machine axially opposite the first axial end.

Embodiments may include combinations of the above features.

In another aspect, the disclosure describes a turbofan gas turbine engine comprising:

a fan through which ambient air is propelled;

a core receiving a first portion of the air propelled by the fan, the core including in serial flow communication:

a core compressor pressurizing the first portion of the air propelled by the fan;

a combustor in which the pressurized air is mixed with fuel and ignited to generate a stream of combustion gas; and a core turbine extracting energy from the combustion gas;

a bypass duct receiving a second portion of the air propelled by the fan;

an electric machine system including:

a system turbine interacting with a flow of air extracted from the bypass duct and discharging the flow of air;

an electric machine having a passage extending therethrough, the passage having an inlet receiving the flow of air discharged from the system turbine and an outlet discharging the flow of air; and an air mover receiving the flow of air discharged from the passage of the electric machine, propelling the flow of air and discharging the flow of air.

The turbofan gas turbine engine may comprise: a first conduit conveying the flow of air from a first location in the bypass duct to the system turbine; and a second conduit conveying the flow of air from the air mover to a second location in the bypass duct downstream of the first location.

The system turbine, the electric machine and the air mover may be disposed outside of the bypass duct.

The electric machine may include a machine stator and a machine rotor. A rotor of the system turbine, a rotor of the air mover and the machine rotor may be coaxial and are mounted for common rotation. The electric machine may be disposed axially between the system turbine and the air mover.

The air mover may be a centrifugal compressor. The system turbine may be a radial turbine. The air mover and the system turbine may be coaxial. The electric machine may be disposed axially between the system turbine and the air mover.

Embodiments may include combinations of the above features.

In a further aspect, the disclosure describes a method for cooling an electric machine. The method comprises:

receiving a flow of air;

expanding and cooling air from the flow of air using a turbine;

conveying the flow of air from the turbine through the electric machine to extract heat from the electric machine using the flow of air; and drawing the flow of air through the electric machine using an air mover.

The method may comprise rotating a rotor of the turbine, a rotor of the air mover, and a rotor of the electric machine at a same rotational speed.

The method may comprise rotating a rotor of the turbine, a rotor of the air mover, and a rotor of the electric machine about a same axis.

The method may comprise receiving the flow of air from a bypass duct of a turbofan gas turbine engine.

The method may comprise discharging the flow of air from the air mover into the bypass duct.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The present disclosure describes air-cooled electric machines, systems for cooling electric machines and associated methods. The electric machines disclosed herein may be electric motors, electric generators and electric machines that can operate as both motors and as generators in different modes of operation. In some embodiments, systems for cooling electric machines described herein may include a reverse air cycle machine where an upstream turbine, the electric machine and a downstream compressor are operatively disposed in serial flow communication.

In some embodiments, the systems and methods disclosed herein may be relatively low-weight, compact and/or simple compared to existing fluid cooling systems and methods. In embodiments where the electric machine is integrated with an aircraft engine, the systems and methods disclosed herein may have a relatively low impact on the performance of the aircraft engine. In some embodiments, the use of the reverse air cycle machine may promote low internal windage losses inside of the electric machine due to the lower pressure of the cooling air being conveyed through the electric machine.

Aspects of various embodiments are described below through reference to the drawings. The term "connected" may include both direct connection (in which two elements contact each other) and indirect connection (in which at least one additional element is located between the two elements). The term "substantially" as used herein may be applied to modify any quantitative representation which could permissibly vary without resulting in a change in the basic function to which it is related.

Figure 1:
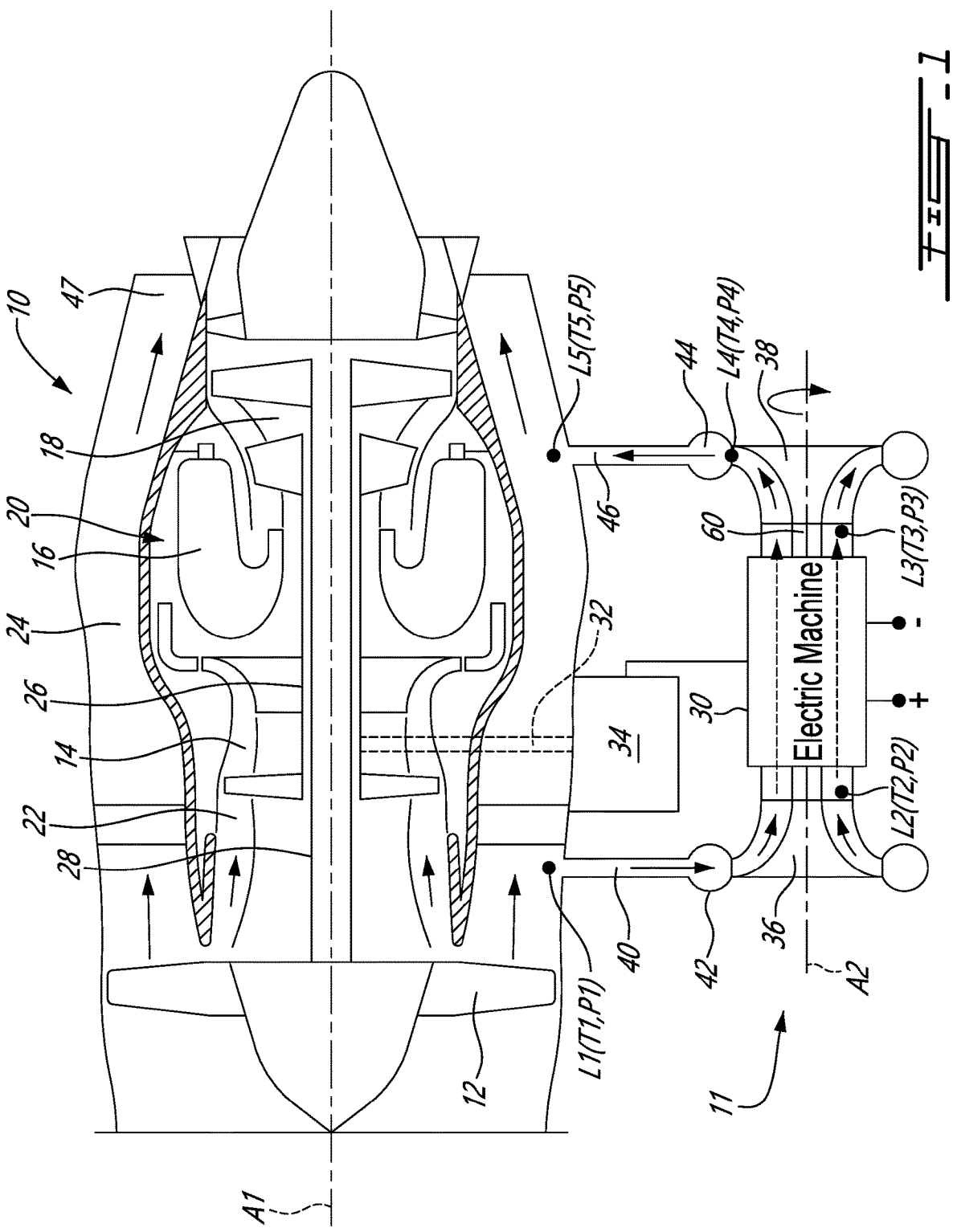
FIG. 1 is a schematic axial cross-sectional view of a turbofan gas turbine engine including an exemplary electric machine system as described herein.

FIG. 1 is a schematic axial cross-sectional view of a turbofan gas turbine engine as an exemplary aircraft engine 10 (referred hereinafter as "engine 10") including an electric machine system 11 (referred hereinafter as "system 11") as described herein. System 11 may be integrated with engine 10 or may be used separately of engine 10 in other aircraft (e.g., auxiliary power unit (APU)) applications or non-aircraft (e.g., industrial) applications. System 11 may be integrated with other types of aircraft engines.

Engine 10 may be configured to propel an aircraft and may be mounted to a wing or to a fuselage of a fixed-wing aircraft for example. Engine 10 may be of a type suitable for use in subsonic flight, generally comprising in serial flow communication, fan 12 through which ambient air is propelled, a multistage core compressor 14 for pressurizing the air, combustor 16 in which the pressurized air is mixed with fuel and ignited for generating an (e.g., annular) stream of hot combustion gas, and core turbine section 18 including one or more core turbines for extracting energy from the combustion gas.

Core compressor 14, combustor 16 and core turbine section 18 may be part of core 20 of engine 10 and may be disposed serially along core gas path 22. Core 20 may receive a first (e.g., radially-inner) portion of the air propelled by fan 12. Engine 10 may also include bypass duct 24 receiving a second (e.g., radially-outer) portion of the air propelled by fan 12. Bypass duct 24 may be disposed radially outwardly of core 20 and may substantially completely surround core 20. Core gas path 22 and bypass duct 24 may be separate and receive different portions of the air that is propelled by fan 12. During operation of engine 10, the first portion of air may travel generally from left to right along core gas path 22, and the second portion of air may travel generally from left to right along bypass duct 24 relative to the orientation of engine 10 in FIG. 1.

In some embodiments, engine 10 may be a multi-spool engine. For example, one or more stages of core compressor 14, one or more stages of core turbine section 18 and high-pressure shaft 26 may define a first (high-pressure) spool. Fan 12, one or more stages of core turbine section 18 and low-pressure shaft 28 may define a second (low-pressure) spool. In some embodiments, high-pressure shaft 26 and low-pressure shaft 28 may be coaxial and may separately rotate about the same engine axis A1.

In some embodiments, system 11 may be incorporated into engine 10. System 11 may include electric machine 30, which may be drivingly connected to (i.e., in torque-transmitting engagement with) a shaft of engine 10. For example, electric machine 30 may be drivingly connected to high-pressure shaft 26 via tower shaft 32 and accessory gearbox 34. In some embodiments, electric machine 30 may be operable as a starter motor for driving rotation of high-pressure shaft 26 during starting of engine 10. In some embodiments, electric machine 30 may be operable as a generator driven by high-pressure shaft 26 for generating electricity and powering one or more electric loads associated with engine 10 and/or associated with an aircraft to which engine 10 may be mounted. In some embodiments, electric machine 30 may be a starter generator operable as a motor when starting engine 10 and also operable as a generator after start-up of engine 10 and during operation of engine 10. For example, electric machine 30 may be a direct current (DC) brushed starter generator.

Electric machine 30 may generate heat during operation and air cooling may be used to extract heat from electric machine 30. Electric machine 30 may be incorporated into system 11, which may also include turbine 36 and an air mover (e.g., including a bladed rotor) suitable for propelling the flow of air to drive (i.e., draw, pull, suction) the flow of air out of electric machine 30. The air mover may be compressor 38 for example. In some embodiments, turbine 36, electric machine 30 and compressor 38 may be disposed outside of bypass duct 24. In various embodiments, turbine 36 may include a radial turbine and/or an axial turbine. In various embodiments, compressor 38 may include a centrifugal compressor and/or an axial compressor such as a fan for example.

During operation of system 11, a flow of air may be received at turbine 36 from first location L1 in bypass duct 24 and/or from another location. The air at first location L1 may have a first temperature T1 and a first pressure P1. The air from the flow of air may be expanded and/or cooled due to the interaction of the flow of air with turbine 36. For example, the air at second location L2 may have a second temperature T2 lower than at first location L1 so that T2<T1. The air at second location L2 may also have second pressure P2 lower than at first location L1 so that P2<P1.

The air that is discharged from turbine 36 may then be conveyed through one or more passages (e.g., cooling channels) of electric machine 30 so that heat may be extracted from electric machine 30 using the flow of air. The air that is conveyed through electric machine 30 may absorb and carry heat generated in electric machine 30 to third location L3. The air at third location L3 may have a third temperature T3 and a third pressure P3. The air discharged from electric machine 30 at third location L3 may be warmer than the air at second location L2 so that T3>T2. The air discharged from electric machine 30 at third location L3 may be at a lower pressure than the air at second location L2 so that P3<P2.

The air that is discharged from electric machine 30 at location L3 may then be received at compressor 38 and pressurized by compressor 38 before being discharged from compressor 38. Compressor 38 may propel the flow of air and help draw (i.e., pull) the air through electric machine 30 and optionally through turbine 36 by producing a region of relatively lower pressure downstream of electric machine 30. In various embodiments, the air may be discharged by compressor 38 at fourth location L4 and directed to fifth location L5 in bypass duct 24 or at some other location. The air at fourth location L4 may have a fourth temperature T4 and a fourth pressure P4. The air discharged from compressor 38 at fourth location L4 may be warmer than the air at third location L3 so that T4>T3. The air discharged from compressor 38 at fourth location L4 may be at a higher pressure than the air at third location L3 so that P4>P3.

In some embodiments, fifth location L5 may be downstream of first location L1 along bypass duct 24. The air at fifth location L5 may have a fifth temperature T5 and a fifth pressure P5. The air in bypass duct 24 at fifth location L5 may be warmer than the air at fourth location L4 so that T5>T4. The air in bypass duct 24 at fifth location L5 may be at a lower pressure than the air at fourth location L4 so that P5<P4.

In some embodiments, the flow of air may be extracted from first location L1 of bypass duct 24 and conveyed to turbine 36 via first conduit 40 (e.g., pipe, tube, hose) and first volute 42. In some embodiments, the flow of air may be discharged from compressor 38 and conveyed to fifth location L5 of bypass duct 24 via second volute 44 and second conduit 46 (e.g., pipe, tube, hose).

In some embodiments, the operation of system 11 for cooling of electric machine 30 may have a relatively low impact on the performance of engine 10. For example, the air that is extracted from first location L1 of bypass duct 24 may be returned to bypass duct 24 at fifth location L5 downstream of first location L1 to achieve little to no net air bleed from bypass duct 24. Some of the heat/energy extracted from electric machine 30 and carried by the flow of air may be recovered by the injection of the flow of air back into bypass duct 24 and by the expansion of the air in exhaust nozzle 47 of bypass duct 24 and thereby contribute to the thrust produced by engine 10. In some embodiments, system 11 may be relatively compact and may not require an external radiator.

Figure 2:
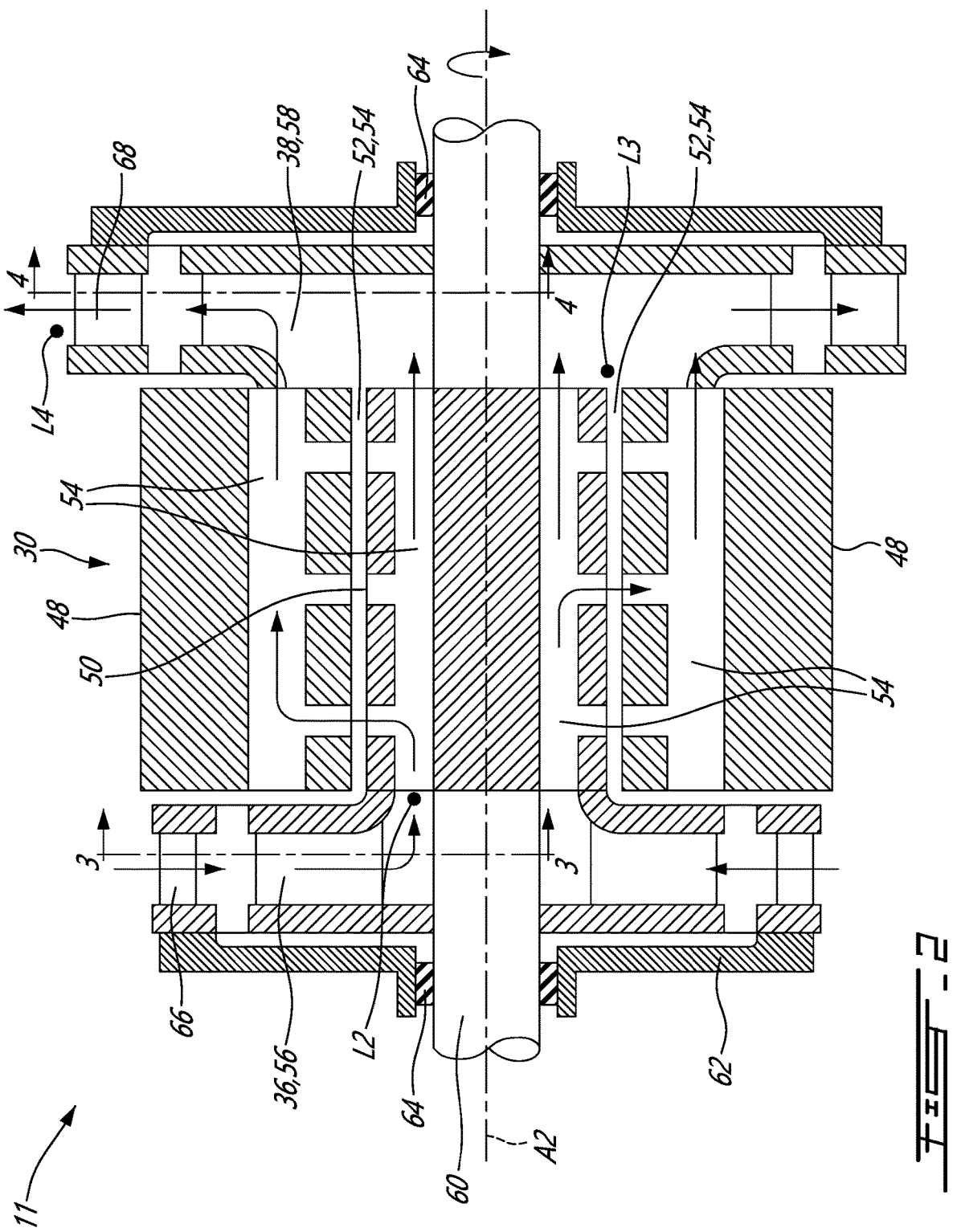
FIG. 2 is a schematic axial cross-sectional view of the electric machine system of FIG. 1.

FIG. 2 is a schematic axial cross-sectional view of system 11 including turbine 36, electric machine 30 and compressor 38 operatively disposed in serial flow communication to convey the flow of air used to cool electric machine 30 from first location L1 to second location L2, to third location L3 and to fourth location L4. In some embodiments, one or more additional electric machines 30 may be included in system 11 and arranged in serial flow communication between turbine 36 and compressor 38. In relation to the flow of air used to cool electric machine(s) 30, turbine 36 may be disposed upstream of electric machine(s) 30 and compressor 38 may be disposed downstream of electric machine(s) 30 so that turbine 36 and compressor 38 may define a reverse air cycle machine.

Electric machine 30 may be configured to operate as a motor where electric machine 30 converts electricity into mechanical energy driving the rotation of shaft 60, and/or as a generator where electric machine 30 converts mechanical energy from the rotation of shaft 60 into electricity. Heat may be generated by electric machine 30 due to Joule heating from electric current passing through windings, and other energy losses within electric machine 30. Electric machine 30 may include machine stator 48 and machine rotor 50 rotatable relative to machine stator 48 about system axis A2. Machine stator 48 and machine rotor 50 may be radially spaced apart by air gap 52.

Electric machine 30 may have one or more passages 54 (i.e., cooling channels) extending (e.g., axially) therethrough to convey the flow of air through electric machine 30. Machine rotor 50 may have one or more passages 54 extending therethrough. Machine stator 48 may have one or more passages 54 extending therethrough. In some embodiments, passages 54 may include air gap 52. Passages 54 may be open-ended to permit the flow of air to pass through electric machine 30. In some embodiments, electric machine 30 may include one passage 54 or a plurality of interconnected passages 54 that define a tortuous path for the flow of air so that the air may percolate through electric machine 30 to permit cooling of different regions of electric machine 30.

Turbine 36 may have an inlet receiving the flow of air from first volute 42 shown in FIG. 1, and may have an outlet at second location L2 where the flow or air is discharged from turbine 36. The air flow that is discharged from turbine 36 at second location L2 may be received into one or more inlets of passage(s) 54, which may be downstream of turbine 36 such as at second location L2 for example. The passage(s) 54 may convey the flow of air to one or more regions of electric machine 30 and convey the flow or air generally axially to one or more outlets of passage(s) 54 at third location L3. The inlet(s) of passage(s) 54 may be disposed at a first axial end of electric machine 30 (e.g., at second location L2) and the outlet(s) of passage(s) 54 may be disposed at a second axial end of electric machine 30 (e.g., at third location L3) axially opposite the first axial end relative to system axis A2. The air flow that is discharged from passage(s) 54 at third location L3 may then be received into an inlet of compressor 38 downstream of electric machine 30 such as at third location L3 for example. Compressor 38 may have an outlet at fourth location L4 for discharging the flow of air from compressor 38 and into second volute 44 shown in FIG. 1.

Turbine 36 may include (e.g., bladed) turbine rotor 56 which may be rotatable about system axis A2 or about another axis. Compressor 38 may include (e.g., bladed) compressor rotor 58 (i.e., impeller), which may be rotatable about system axis A2 or about another axis. In some embodiments, turbine rotor 56 and machine rotor 50 may be coaxial. In some embodiments, compressor rotor 58 and machine rotor 50 may be coaxial. In some embodiments, turbine rotor 56 and compressor rotor 58 may be coaxial. In some embodiments, turbine rotor 56, machine rotor 50 and compressor rotor 58 may be coaxial. In some embodiments, electric machine 30 may be disposed axially between turbine 36 and compressor 38 along system axis A2.

In some embodiments, turbine rotor 56 and machine rotor 50 may be drivingly connected for common rotation (i.e., at the same rotational speed and in the same direction). In some embodiments, machine rotor 50 and compressor rotor 58 may be drivingly connected for common rotation. In some embodiments, turbine rotor 56 and compressor rotor 58 may be drivingly connected for common rotation. In some embodiments, turbine rotor 56, machine rotor 50 and compressor rotor 58 may be drivingly connected for common rotation. For example, in various embodiments, two or more of turbine rotor 56, machine rotor 50 and compressor rotor 58 may be mounted for common rotation on the same shaft 60 via splined or other suitable couplings. For example, shaft 60 may be rotatable about system axis A2 and may extend beyond the axial boundaries of electric machine 30 to permit engagement with turbine rotor 56 and/or with compressor rotor 58. In some embodiments, turbine rotor 56, machine rotor 50 and compressor rotor 58 may be rotatable at the same rotational speed, in the same direction and about the same system axis A2. In some embodiments, two or more of turbine rotor 56, machine rotor 50 and compressor rotor 58 may be rotatable at different rotational speeds, in different directions and/or about different axes.

In some embodiments, turbine 36, electric machine 30 and compressor 38 may be disposed inside housing 62, which is partially shown in FIG. 2. In some embodiments, shaft 60 may be rotatably supported by bearings. In some embodiments, shaft 60 may be contained entirely within housing 62. In some embodiments, shaft 60 may extend through housing 62 and one or more seals 64 may be disposed between shaft 60 and housing 62 to hinder air flow in and/or out of housing 62 at such interface(s).

Figure 3:
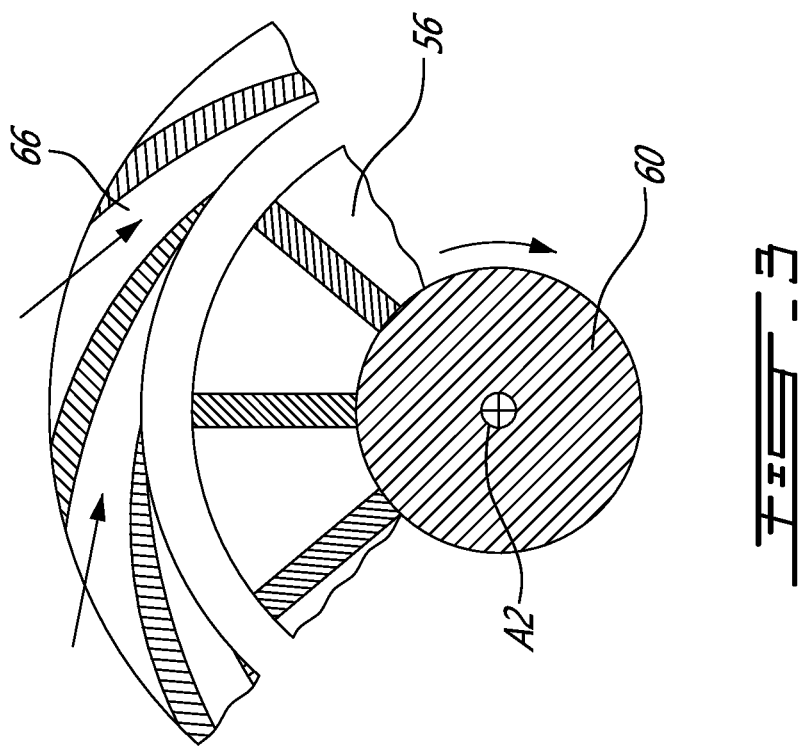
FIG. 3 is a schematic cross-sectional view through an exemplary turbine of the electric machine system taken along line 3-3 of FIG. 2.

FIG. 3 is a schematic cross-sectional view through turbine 36 taken along line 3-3 of FIG. 2. In some embodiment, turbine 36 may be a radial turbine receiving the flow of air via first volute 42 and conveying the flow of air radially inwardly and also axially toward electric machine 30. Turbine 36 may include bladed turbine rotor 56 and stationary (e.g., bladed) turbine stator 66 disposed within a suitable turbine housing. Turbine rotor 56 may be installed directly on shaft 60 via suitable splined or other coupling and may be rotatable with shaft 60. Turbine stator 66 may be stationary relative to rotatable turbine rotor 56. Turbine stator 66 may include a plurality of stationary vanes serving to orient the flow of air upstream of turbine rotor 56. During operation, the air flowing through turbine 36 may be expanded and cooled. The energy extracted from the flow of air by turbine 36 may contribute to driving the rotation of shaft 60.

Figure 4:
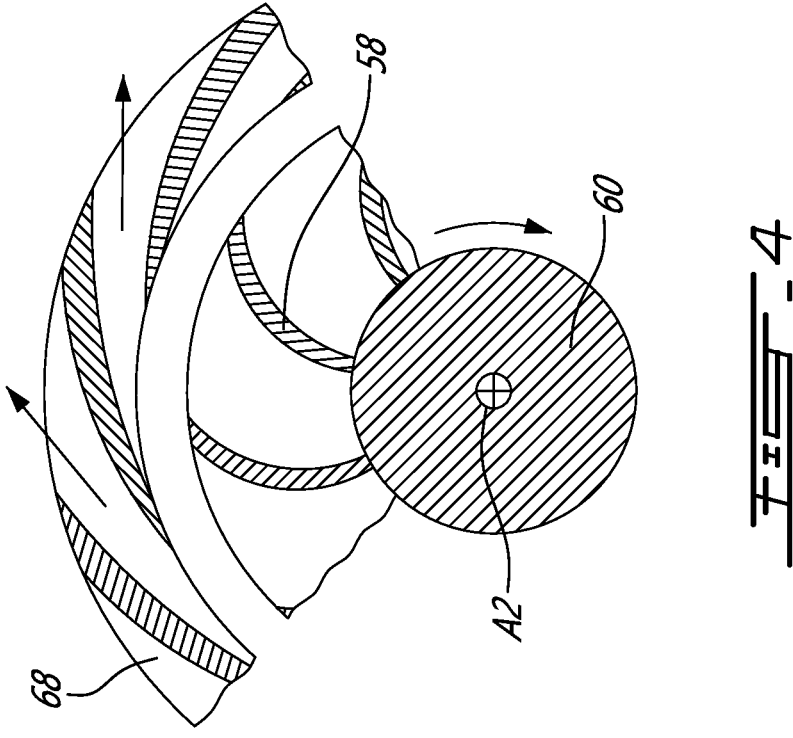
FIG. 4 is a schematic cross-sectional view through an exemplary compressor of the electric machine system taken along line 4-4 of FIG. 2.

FIG. 4 is a schematic cross-sectional view through compressor 38 taken along line 4-4 of FIG. 2. In some embodiment, compressor 38 may be a centrifugal compressor driving the flow of air through electric machine 30 and conveying the flow of air radially outwardly to fourth location L4 via second volute 44. Compressor 38 may include bladed compressor rotor 58 (e.g., impeller) and stationary (e.g., bladed) compressor stator 68 disposed within a suitable compressor housing. Compressor rotor 58 may be installed directly on shaft 60 via suitable splined or other coupling and may be rotatable with shaft 60. Compressor stator 68 may be stationary relative to rotatable compressor rotor 58. Compressor stator 68 may include a plurality of stationary vanes serving to orient the flow of air downstream of compressor rotor 58. During operation, the air flowing through compressor 38 may be propelled and compressed.

The rotation of compressor rotor 58 may be driven by the rotation of shaft 60 and may therefore extract mechanical energy from shaft 60. In some embodiments, the energy drawn from shaft 60 by compressor rotor 58 may be mitigated for a lower net impact on the operation of engine 10. For example, the amount of pumping power required from compressor 38 may be selected to achieve a suitable internal operating temperature of electric machine 30 to promote lower internal losses.

In some embodiments, the use of the reverse air cycle machine for cooling electric machine 30 may promote low internal windage losses inside of electric machine 30 due to the lower pressure of the cooling air being conveyed through electric machine 30.

Figure 5:
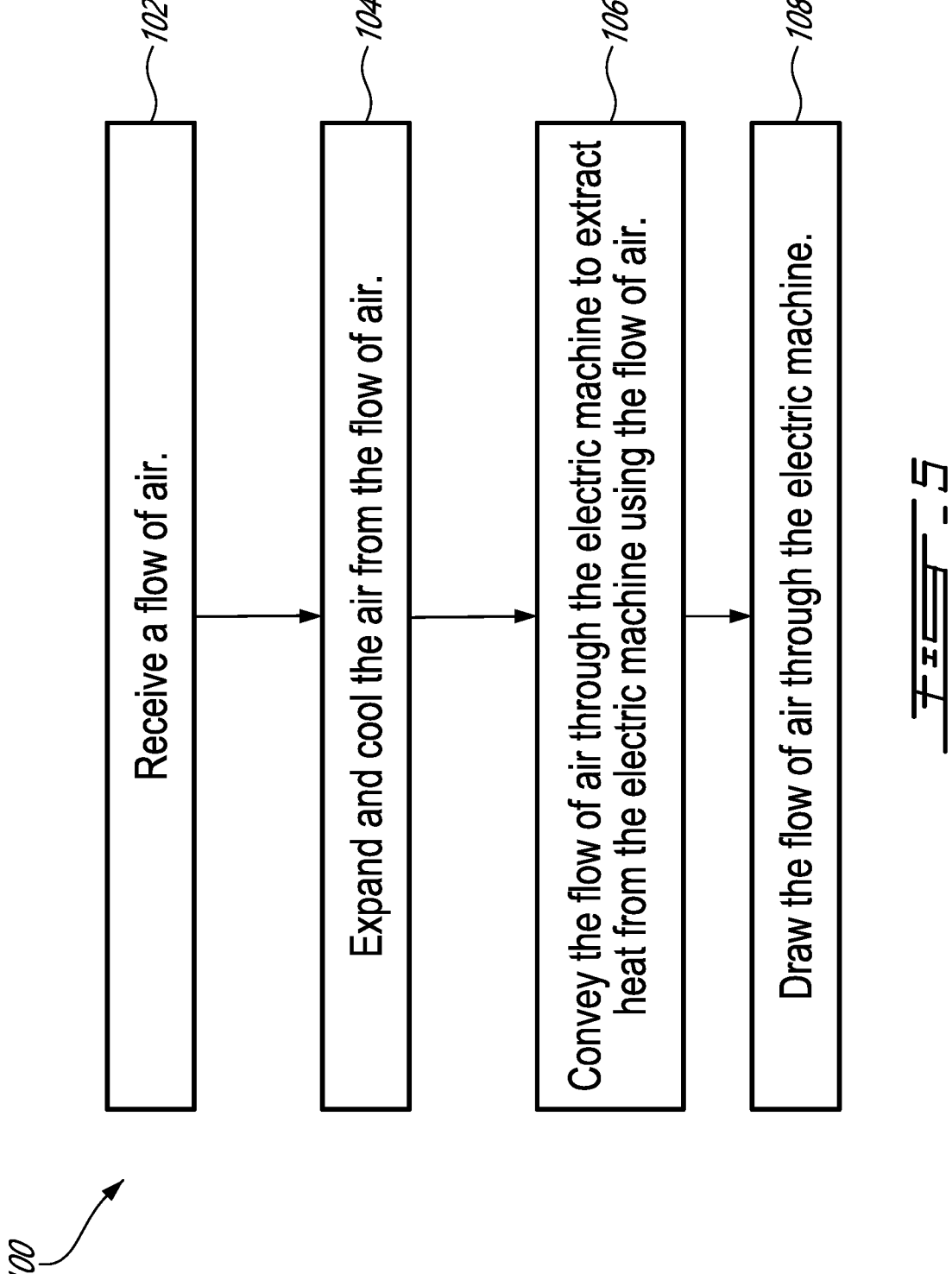
FIG. 5 is a flow diagram of a method for cooling an electric machine.

FIG. 5 is a flow diagram of an exemplary method 100 for cooling electric machine 30 or another electric machine. Method 100 may be performed using system 11 or using another system. Aspects of engine 10 may be incorporated into method 100. Method 100 may include other actions including other actions disclosed herein. In various embodiments, method 100 may include:

receiving a flow of air (block 102);

expanding and cooling the air from the flow of air using turbine 36 (block 104);

conveying the flow of air from turbine 36 through electric machine 30 to extract heat from electric machine 30 using the flow of air (block 106); and drawing (i.e., pulling) the flow of air through electric machine 30 using compressor 38 (block 108).

In some embodiments, method 100 may include rotating turbine rotor 56, compressor rotor 58, and machine rotor 50 at a same rotational speed.

In some embodiments, method 100 may include rotating turbine rotor 56, compressor rotor 58, and machine rotor 50 about a same axis.

In some embodiments of method 100, the flow of air is received from bypass duct 24 of a turbofan gas turbine engine such as engine 10 for example. In some embodiments, method 100 may include discharging the flow of air from compressor 38 back into bypass duct 24.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A turbofan gas turbine engine comprising:

a fan through which ambient air is propelled;

a core receiving a first portion of the air propelled by the fan, the core including in serial flow communication:

a core compressor pressurizing the first portion of the air propelled by the fan;

a combustor in which the pressurized air is mixed with fuel and ignited to generate a stream of combustion gas; and a core turbine extracting energy from the combustion gas;

a bypass duct receiving a second portion of the air propelled by the fan;

an electric machine system including:

a system turbine interacting with a flow of air extracted from the bypass duct and discharging the flow of air;

an electric machine having a passage extending therethrough, the passage having an inlet receiving the flow of air discharged from the system turbine and an outlet discharging the flow of air;

an air mover receiving the flow of air discharged from the passage of the electric machine, propelling the flow of air and discharging the flow of air;

a first conduit conveying the flow of air from a first location in the bypass duct to the system turbine; and a second conduit conveying the flow of air from the air mover to a second location in the bypass duct downstream of the first location and downstream of the fan.

2. The turbofan gas turbine engine as defined in claim 1, wherein the system turbine, the electric machine and the air mover are disposed outside of the bypass duct.

3. The turbofan gas turbine engine as defined in claim 1, wherein:

the electric machine includes a machine stator and a machine rotor;

a rotor of the system turbine, a rotor of the air mover and the machine rotor are coaxial and are mounted for common rotation; and the electric machine is disposed axially between the system turbine and the air mover.

4. The turbofan gas turbine engine as defined in claim 1, wherein:

the air mover is a centrifugal compressor;

the system turbine is a radial turbine;

the air mover and the system turbine are coaxial; and the electric machine is disposed axially between the system turbine and the air mover.

5. A method for cooling an electric machine, the method comprising:

receiving air propelled by a fan of a turbofan gas turbine engine into a bypass duct of the turbofan gas turbine engine;

receiving a flow of air from the bypass duct at a first location in the bypass duct downstream of the fan;

expanding and cooling air from the flow of air using a turbine;

conveying the flow of air from the turbine through the electric machine to extract heat from the electric machine using the flow of air;

drawing the flow of air through the electric machine using an air mover; and discharging the flow of air from the air mover into the bypass duct at a second location in the bypass duct downstream of the first location and downstream of the fan.

6. The method as defined in claim 5, comprising rotating a rotor of the turbine, a rotor of the air mover, and a rotor of the electric machine at a same rotational speed.

7. The method as defined in claim 5, comprising rotating a rotor of the turbine, a rotor of the air mover, and a rotor of the electric machine about a same axis.

* * * * *